Figure 1:
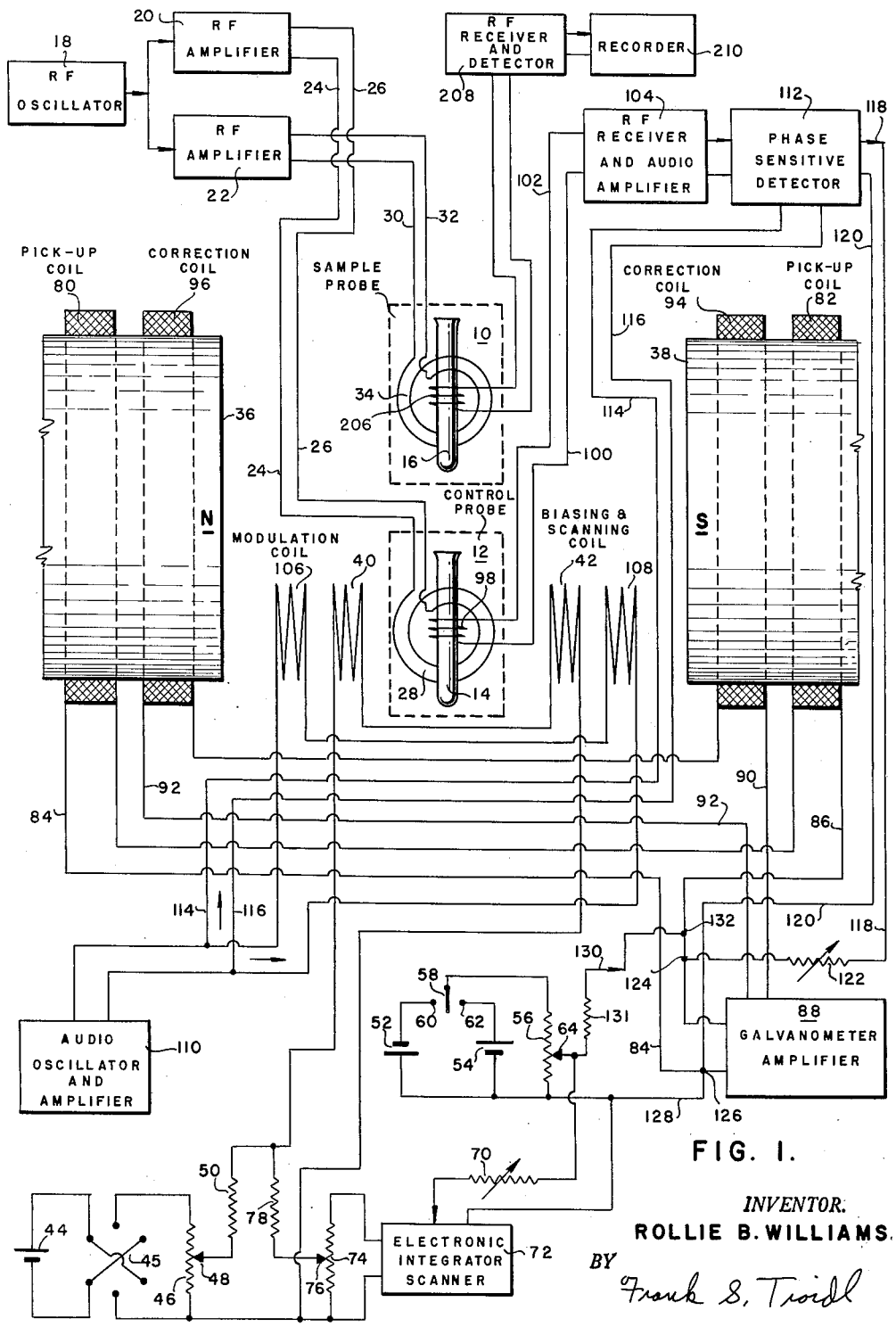

May 8, 1962 R. B. WILLIAMS 3,034,040
NUCLEAR MAGNETIC RESONANCE SPECTROMETER
Filed May 1, 1959 2 Sheets-Sheet 2

INVENTOR.
ROLLIE B. WILLIAMS,
BY Frank S. Troidl
ATTORNEY.

3,034,040
NUCLEAR MAGNETIC RESONANCE
SPECTROMETER
Rollie B. Williams, Baytown, Tex., assignor, by mesne assignments, to Esso Research and Engineering Company, Elizabeth, N.J., a corporation of Delaware
Filed May 1, 1959, Ser. No. 810,466
6 Claims. (Cl. 324—.5)

This invention relates to nuclear magnetic resonance spectroscopy. More particularly, this invention relates to a novel and useful method for controlling a magnetic field by use of apparatus for nullifying the effects of fluctuations and drift inevitably present in the electric, electronic, magnetic, and electromagnetic elements found in a nuclear magnetic resonance spectrometer.

Atomic nuclei which have resultant magnetic moments and angular momenta, if placed in a magnetic field, will tend to align themselves with the field. In the process of approaching this alignment, the direction of the angular momentum vector of a given nucleus must change, which results in a precession of the nucleus about the axis of the orienting magnetic field. If magnetic energy is applied to the nuclei at a frequency, substantially close to that of the free precession, the nuclei will be made to precess substantially in phase with the applied frequency. The externally manifested characteristics of the phenomenon are similar to the characteristics of any of the other more familiar resonant systems.

It is a property of many subatomic particles that they can exist in various energy states. Transition from one energy state to a second state is accompanied by the absorption or radiation of energy, at a characteristic frequency that is proportional to the energy difference between the states. The frequency of energy being radiated or absorbed is proportional to field strength if the subatomic particles are nuclei having magnetic moments. Thus, with a constant field strength, if energy is applied to the nuclei and the frequency varied through the absorption frequency, a characteristic similar to the resonance phenomenon effected in an inductance-capacitance tank circuit is detected. In the alternative, if energy is applied to the nuclei with a constant frequency and the field strength is varied, an absorption band can be obtained with a similar characteristic.

In order to use very slow scanning rates and obtain high resolution necessary for certain nuclear magnetic resonance spectrometer operations, the field fluctuations in the system must be maintained to a very low minimum. For example, field fluctuations which cause an error in the indicated magnetic field when compared with the actual magnetic field of as little as 0.1 milligauss is undesirable with a magnetic field of about 10,000 gauss when using the nuclear magnetic resonance spectrometer for slow scanning rates to obtain high resolution.

For purposes of this description and the appended claims, the field fluctuation components are divided into two basic types, "long-term" and "short-term." The "short-term" field fluctuation is defined as field fluctuation introduced into the system having frequencies of about 1 cycle per second and higher. "Long-term" field fluctuation is defined as fluctuation introduced into the system having frequencies up to about 1 cycle per second. Hence, the variations in zero drift due to room temperature variation and temperature changes of the magnet itself are "long-term" fluctuations. Also, positional changes such as movements of the magnet caused by slight movements of the floor will cause "long-term" fluctuations. The background noise due to thermal agitation in grid circuits (Johnson noise) is an example of "short-term" and "long-term" fluctuation.

Various means have been devised to correct for magnetic field fluctuations introduced in nuclear magnetic resonance systems. It has been found, however, that in most previous devices, if it is very effective in reducing "short-term" fluctuations, it is ineffective in reducing "long-term" fluctuations; conversely, if the device is effective in reducing "long-term" fluctuations, it is ineffective in reducing the effects of "short-term" fluctuations. Hence, a nuclear magnetic resonance spectrometer which has means therein for effectively eliminating the effects of both the "short-term" fluctuations and the "long-term" fluctuations has obvious advantages.

The object of this invention is to provide the art with a nuclear magnetic resonance spectrometer which automatically corrects for fluctuations introduced into the system whether they be "short-term" or "long-term." Hence, this invention enables one to apply very slow scan rates necessary for the obtainment of high resolution. This results in vastly improved results when compared to the results obtained by previous nuclear magnetic resonance spectrometers.

Briefly described, my new invention includes a control probe. A known material is included as a part of the control probe. A transmitting system is used to cause the nuclei of the known material to precess in phase at substantially their natural precession frequency. A biasing and scanning circuit is used to increase or decrease the field strength through a sample probe which includes the unknown material, the constituents of which are to be determined. A first magnetic field change detecting and correcting circuit detects magnetic field changes and applies a corrective voltage to nullify the effects of the "short-term" changes in the magnetic field through the magnet and the control probe. A second magnetic field change detecting circuit is also included in my new system. This second magnetic field change detecting circuit is particularly effective in correcting for "long-term" magnetic field changes. The corrective voltage from the second magnetic field change detecting and correcting circuit is fed to the first magnetic field change detecting and correcting circuit in such a manner that the system is corrected for "long-term" changes. The unique cooperation of the entire system including the two detecting and correcting circuits causes the magnetic field through the control probe to be kept substantially constant regardless of changes in the system caused by "long-term" or "short-term" changes.

Even though the magnetic field through the control probe is maintained constant, the sample probe can be scanned by an ever-changing magnetic field of constant time rate of field scan. As the magnetic field through the sample probe is altered, absorption bands will appear on a recorder from which the unknown material and relative constituents of the unknown material in the sample probe can be determined. All errors due to unwanted magnetic field changes introduced into the system, however, have been nullified.

Figure 2:
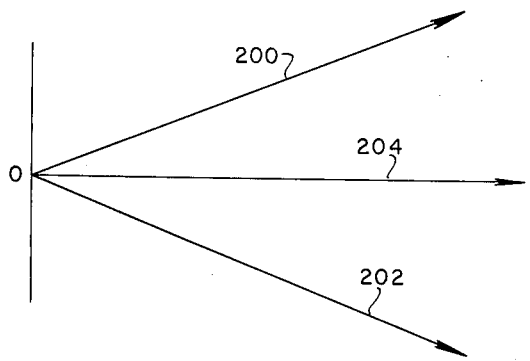
Figure 3:
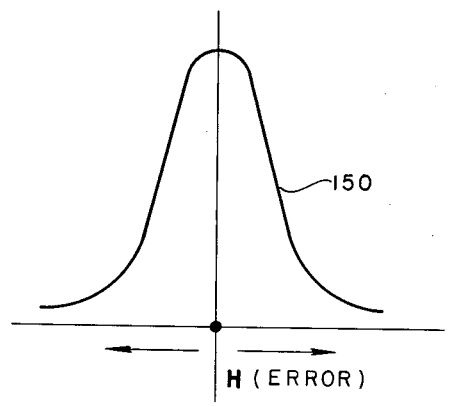
Figure 4:
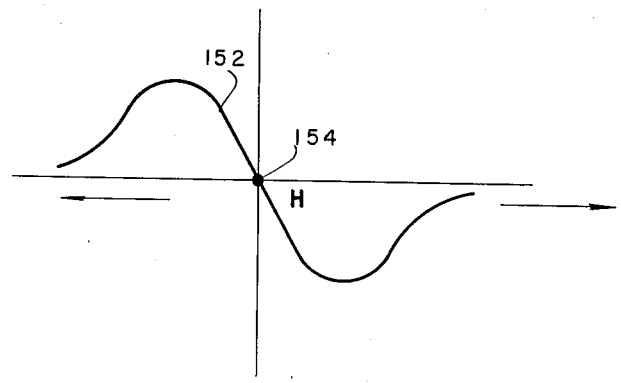

The invention as well as its many advantages will be further understood by referring to the following drawings and detailed description in which:

FIG. 1 is a view, partially in block diagram and partially in electrical schematic diagram illustrating the new nuclear magnetic resonance spectrometer; and FIGS. 2, 3, and 4 are graphical representations useful in explaining my new invention.

Referring to FIG. 1, my new nuclear magnetic resonance spectrometer includes a sample probe, indicated generally by the numeral 10, and a control probe, indicated generally by the numeral 12. The control probe 12 includes a tube 14 which contains a suitable known material. For example, a sample of water may be included in the tube 14. A small amount of paramagnetic material such as $MnSO_4$ may be added to the water sample to reduce the relaxation time to about $10^{-3}$ seconds.

The sample probe 10 includes a tube 16. Tube 16 contains the unknown material.

A radio fequency transmitting circuit is utilized to transmit radio frequency currents to both the sample probe 10 and the control probe 12. The radio frequency transmitting circuit includes a radio frequency oscillator 18. The radio frequency output from oscillator 18 is fed to radio frequency amplifier 20 and radio frequency amplifier 22. The radio frequency output from amplifier 20 is conducted through leads 24 and 26 to radio frequency transmitting coils 28, located in the control probe adjacent the tube 14. The radio frequency output from amplifier 22 is conducted through leads 30 and 32 to a radio frequency transmitting coil 34 located in the sample probe 10 adjacent the tube 16.

The frequencies of the radio frequency currents applied to both transmitting coil 28 in the control probe and the transmitting coil 34 in the sample probe are the same. This frequency is adjusted to be substantially the same frequency as the natural or resonant precession frequency of the nuclei of the material in the tube 14 located in control probe 12 at the desired operating field strength.

A magnetic field is applied through both the sample probe 10 and the control probe 12. This magnetic field might be generated by means of an electromagnet, or in the alternative, by means of a permanent magnet such as a magnet having the pole faces 36 and 38, as shown in FIG. 1. The sample probe 10 and the control probe 12 are located in the gap between pole faces 36 and 38.

In order to determine the absorption bands of the unknown material in the sample probe, the strength of the magnetic field across poles 36 and 38 must be varied. The means for scanning includes a biasing and scanning circuit including inductance coils 40 and 42 connected in series, one coil on each side of the control probe 12, with the fields from each coil being in the same direction.

There may be a slight difference in the magnetic field at the control probe and the magnetic field at the sample probe due to their different positions within the gap. A bias current is provided to make the fields substantially the same at the two positions when there is no scanning current. The biasing current is provided by means of a battery 44. A double pole-double throw switch 45 is used to connect a resistor 46 across the battery 44. The position of switch 45 establishes the polarity of the bias current. A tap 48 determines the amount of bias current fed to the biasing and scanning coils 40 and 42 and thus provides a bias current control. The bias current is fed to the series connection of coils 40 and 42 through a resistor 50.

The scanning rate and the direction of scan are controlled by an electrical circuit including batteries 52 and 54. The positive terminal of battery 52 is connected to the negative terminal of battery 54. A resistor 56 may be connected to either the battery 52 or the battery 54 by means of switch 58. Resistor 56 is connected across battery 52 when the switch 58 is in contact with contact 60. Resistor 56 is connected across battery 54 when the switch 58 engages contact 62 connected to the positive terminal of battery 54. When battery 52 is connected to resistor 56, the field through the sample probe 10 will be continually decreased as will be described later. Conversely, when battery 54 is connected to resistor 56, the magnetic field across sample probe 10 will be continually increased.

A voltage tap 64 takes a voltage from resistor 56. The tapped voltage is fed through a scan rate adjusting resistor 70 to an electronic integrator scanner 72. The resistance of resistor 70 is adjustable.

The voltage output from the electronic integrator scanner 72 across the resistor 74 is tapped by means of adjustable tap 76. The tapped voltage from resistor 74 is fed through resistor 78 to the bias and scan coils 40 and 42.

The voltage input to electronic integrator scanner 72 is either positive or negative depending upon the position of switch 58. This voltage input is constant in magnitude. The electronic integrator scanner 72 produces an integrated voltage output across resistor 74 which is of opposite polarity to the polarity of the voltage input. The value of the resistances of resistors 50 and 78 are large enough to provide that the current fed to the coils 40 and 42 is essentially proportional to the algebraic sum of the voltages at taps 48 and 76.

A first magnetic field change detecting circuit and a second magnetic field change detecting circuit are included in my new nuclear magnetic resonance spectrometer. The first magnetic field change detecting circuit includes pickup coil 80 and pick-up coil 82 connected in series with pick-up coil 80 being wound about magnetic pole 36 and pick-up coil 82 being wound about magnetic pole 38. The changes in the magnetic field cause an induced voltage to be developed through the pick-up coils 80 and 82. This induced voltage is fed through lines 84 and 86 to a galvanometer amplifier 88. The output from the galvanometer amplifier 88 is fed through leads 90 and 92 to correction coils 94 and 96 connected in series across leads 90 and 92.

The second magnetic field change detecting circuit includes a coil 98 wrapped about the tube 14 in the control probe 12. Coil 98 has its axis at substantially right angles to the axis of the transmitting coil 28.

An induced voltage having substantially the same frequency as the resonant precessing frequency of the nuclei in the material in the tube 14 is fed through leads 100 and 102 to a radio frequency receiver and audio amplifier 104.

Modulation coils 106 and 108 mounted on opposite sides of the control probe 12 and connected in series are used to modulate the magnetic field, which modulates the resonance and thus the radio frequency signal fed to radio frequency receiver and audio amplifier 104. The series connection of modulation coils 106 and 108 is fed a modulation current by means of an audio oscillator and amplifier 110.

The audio oscillator and amplifier 110 also supplies a phase sensitive detector 112 with a reference current. This reference current is fed to the phase sensitive detector 112 through leads 114 and 116. The audio signal output from radio frequency receiver and audio amplifier 104 is also conducted to the phase sensitive detector 112. Phase sensitive detector 112 is a synchronous (or lock-in) detector. In this way the phase is preserved throughout.

A rectified control signal output from phase sensitive detector 112 is fed through leads 118 and 120. Lead 118 is connected to the lead 86 at junction 124 and includes a feed-back control resistor 122. Lead 120 is connected to lead 84 at junction 126. Thus, the leads 118 and 120, carrying the rectified control signal output, are connected across the input of the galvanometer amplifier 88. Lead 130 including a resistor 131 is connected to lead 86 at junction 132. Lead 128 is connected to lead 84 at junction 126.

Resistor 122 in lead 118 is an adjustable resistor and provides an adjustment for maintaining maximum control without overriding or "hunting."

Operation

The operation of the new nuclear magnetic resonance spectrometer can be best explained by reference to FIG. 1 in conjunction with FIGS. 2, 3, and 4. FIG. 3 shows an absorption signal 150. The peak of absorption signal 150 corresponds to the value of the magnetic field H at the natural precession frequency of the material contained in tube 14 of FIG. 1. Hence, it is desired that the magnetic field H be maintained at a value corresponding to the peak ordinate of FIG. 3. If the magnetic field H varies, an error voltage will be introduced into the system. As formerly stated, this error can be caused by "long-term" variations and "short-term" variations. Of course, as far as the control probe is concerned, the change in magnetic field caused by the scanning and biasing circuit also constitutes an error signal which must be corrected.

Any variation in the magnetic field H corresponding to the field at the peak of the absorption signal 150 of FIG. 3 will introduce an error signal at the output of the phase sensitive detector 112 of FIG. 1. This error signal is proportional to the derivative of the absorption signal 150. Thus, the error signal will be a voltage corresponding to some point on curve 152 shown in FIG. 4. It can be seen that the error signal is approximately proportional to the derivative of the absorption signal 150.

The purpose of my new invention is to efficiently and effectively automatically maintain the magnetic field through the control probe 12 at a value corresponding to the value of H at the point 154 where curve 152 crosses the abscissa.

In order to accomplish this, the adjustable resistor 70 in FIG. 1 is adjusted. The adjustment of adjustable resistor 70 is such that the electronic integrator scanner 72 will scan at the same rate as the galvanometer amplifier 88. Assuming that the switch 58 is connected to contact 60, a negative voltage will be applied as an input to the electronic integrator scanner 72. The electronic integrator scanner 72 receives the input voltage and produces an integrated output voltage of opposite polarity to the input voltage. This output is fed to the bias and scan coils 40 and 42. Thus, the output from the electronic integrator scanner 72 will be of a form to give a field at the control probe such as indicated by line 200 of FIG. 2.

A negative voltage and current will also be applied as an input to the galvanometer amplifier 88 through resistor 131 and lines 128 and 130.

The input current to the galvanometer amplifier 88, because of the feedback between the correction coils 94 and 96 with the pick-up coils 80 and 82, produces an integrated current in coils 94 and 96. The field produced at the control probe by this current in coils 94 and 96 is just equal in magnitude to, but opposite in polarity to, the field produced by the bias and scan coils, as represented by line 202 of FIG. 2. Either resistor 70 or tap 76 on resistor 74 may be adjusted to make the field as represented by line 200 equal in magnitude to the field represented by line 202. The resultant of the lines 200 and 202 is zero, as indicated by line 204. This means that the total magnetic field H through the control probe 12 is maintained constant.

Any "short-term" errors introduced into either or both of the magnetic field change detecting circuits are integrated by the galvanometer amplifier 88 with its pick-up and correction coils and included in the corrective signal from the output thereof. Any "long-term" errors introduced into the electronic circuits produce a change in the rectified control signal output from the phase sensitive detector 112. The "long-term" errors are also fed to the galvanometer amplifier 88.

The first magnetic field change detecting circuit including pick-up coils 80 and 82 is ineffective in detecting "long-term" fluctuations since the induced voltage in coils 80 and 82 is dependent upon a rate of change in magnetic field. Hence, very slow rates of change are not effectively detected. However, the second magnetic field change detecting circuit is sensitive to any magnetic field change, regardless of how small the frequency of the change. Thus, the "long-term" fluctuations cause a control signal output from phase sensitive detector 112 to be fed through lines 118 and 120 to the input of galvanometer amplifier 88. The galvanometer amplifier and coils 94 and 96 integrate this input to correct the magnetic field for "long-term" fluctuations.

Even though the magnetic field $H_0$ through the control probe 12 is maintained essentially constant, the magnetic field through the sample probe 10 may be varied. The instantaneous field through the control probe may be written $H = H_0 + H_m \sin w_m t$, where $H_m$ is the modulation amplitude and $w_m$ the modulation frequency (in radians per second). It is the term $H_0$ which is maintainer essentially constant. The sample probe 10 only "sees" the applied field of the magnet and the change in magnetic field caused by the application of the corrective voltage to the correction coils 96 and 94. Hence, the magnetic field through the sample probe 10 is proportional to the voltage output from the galvanometer amplifier 88 as indicated by line 202 of FIG. 2. As the magnetic field through the sample probe 10 is varied, an absorption band or absorption bands will be detected by detecting coil 206. The voltage induced in the detecting coil 206 is fed to the radio frequency receiver and detector 208 and recorded on recorder 210. From the recorded absorption bands, the unknown material in the sample probe 10 can be determined and the relative constituents of the material ascertained.

I claim:

1. For use in a nuclear magnetic resonance spectrometer having a control probe with known material included as a part thereof: means for applying a magnetic field through the control probe; means adapted to cause the nuclei of the material to precess at substantially their natural frequency; a biasing and scanning circuit; a first magnetic field change detecting circuit which is particularly effective in detecting short-term changes and producing a voltage in response thereto and including a first magnetic field change detecting coil; a second magnetic field change detecting circuit for detecting magnetic field changes including long-term changes and producing a voltage in response thereto and including a second magnetic field change detecting coil; and a correcting circuit, the voltage outputs from said first magnetic field change detecting circuit and said second magnetic field change detecting circuit being fed to said correcting circuit, whereby the magnetic field through the control probe is held substantially constant.

2. For use in a nuclear magnetic resonance spectrometer having a control probe of known material included as a part thereof: means for applying a magnetic field through the control probe; means adapted to cause the nuclei of the material to precess at substantially their natural frequency; a biasing and scanning circuit; a first magnetic field change detecting circuit including at least a first magnetic field detecting coil for detecting changes in the magnetic field and producing a voltage in response thereto; a second magnetic field change detecting circuit for detecting magnetic field changes including long-term changes and producing a voltage in response thereto and including a second magnetic field change detecting coil; and a correcting circuit, the voltage outputs from said first magnetic field change detecting circuit and said second magnetic field change detecting circuit being fed to said correcting circuit, whereby the magnetic field through the control probe is held substantially constant.

3. For use in a nuclear magnetic resonance spectrometer having a control probe with known material included as a part thereof: means for applying a magnetic field through the control probe; means adapted to cause the nuclei of the material to precess at substantially their natural frequency; a biasing and scanning circuit including at least biasing and scanning coils, means for feeding a biasing current to the biasing and scanning coils, an electronic integrator, the output of which is connected to the biasing and scanning coils, and a voltage supply source for supplying a scanning voltage as the input to the electronic integrator; a first magnetic field change detecting circuit including at least pick-up coils for detecting changes in the magnetic field and producing a voltage in response thereto; a second magnetic field change detecting circuit for detecting magnetic field changes including long-term changes and producing a voltage in response thereto; and a correcting circuit, the voltage outputs from said first magnetic field change detecting circuit and said second magnetic field change detecting circuit being fed to said correcting circuit, whereby the magnetic field through the control probe is held substantially constant.

4. For use in a nuclear magnetic resonance spectrometer having a control probe with known material included as a part thereof; means for applying a magnetic field through the control probe; means adapted to cause the nuclei of the material to precess at substantially their natural frequency; a biasing and scanning circuit including at least biasing and scanning coils, means for feeding a biasing current to the biasing and scanning coils, an electronic integrator, the output of which is connected to the biasing and scanning coils, and a voltage supply source for supplying a scanning voltage as the input to the electronic integrator; a first magnetic field change detecting circuit including at least pick-up coils for detecting changes in the magnetic field and producing a voltage in response thereto; a correcting circuit including a galvanometer amplifier and correcting coils for receiving the output from the galvanometer amplifier and counterblance the magnetic field changes; and a second magnetic field change detecting circuit including at least a coil within the control probe for detecting the precessing frequency of the nuclei in said material and producing a signal in response thereto, modulation coils for modulating said signal, a radio frequency receiver and audio amplifier for receiving the modulated signal and producing an audio signal, a phase sensitive detector for receiving said audio signal and having a voltage output, an audio oscillator for supplying the modulation current to the modulation coils and a reference current to the phase sensitive detector, the voltage output from the phase sensitive detector being connected to the galvanometer amplifier whereby the magnetic field through the control probe is held substantially constant.

5. In a nuclear magnetic resonance spectrometer having a sample probe and a control probe and means for applying a radio frequency signal having substantially the same frequency as the resonant frequency of the nuclei of the material in the control probe to a coil associated with the sample probe and a coil associated with the control probe, means for applying a magnetic field through the sample probe and the control probe, a scanning circuit for varying the magnetic field through the sample probe, and means for obtaining and recording the voltage induced by the nuclei of the material in the sample probe, the improvement of voltage generating means particularly responsive to short-term changes in the magnetic field, a correcting circuit including a galvanometer amplifier for receiving the generated voltage and correction coils for receiving the galvanometer amplifier output voltage and applying a corrective voltage to the control probe, means for obtaining a voltage responsive to long-term changes in the magnetic field, and means for feeding the voltage to the correcting circuit in such a manner that the magnetic field through the control probe is kept substantially constant.

6. A system for keeping a magnetic field substantially constant comprising: voltage generating means including a magnetic field change detecting circuit having a detecting coil and particularly responsive to short-term changes in the magnetic field; a correcting circuit including a galvanometer amplifier for receiving the generated voltage, and correction coils for receiving the galvanometer amplifier output voltage and applying a corrective voltage; separate means for obtaining a voltage responsive to long-term changes in the magnetic field and including a detecting coil; and means for feeding the voltage to the correcting circuit in such a manner that the magnetic field is kept substantially constant.

References Cited in the file of this patent

UNITED STATES PATENTS

| | | |
|---|---|---|
| 2,859,403 | Kirshner | Nov. 4, 1958 |
| 2,922,947 | Bloom et al. | Jan. 26, 1960 |
| 2,930,966 | Bell et al. | Mar. 29, 1960 |

OTHER REFERENCES

Bloom et al.: Science, Vol. 122, No. 3173, Oct. 2, 1955, pp. 738 to 741, 324/0.5N.

Thomas: Journal of Research of the National Bureau of Standards, Research Paper RP2104, Vol. 44, June 1950, pp. 569 to 583. 324/0.5N.

Primas et al.: The Review of Scientific Insts., Vol. 28, No. 7, July 1957, pp. 510 to 514. 324/0.5N.

Warmuth et al.: Nuclear Instruments and Methods, Vol. 4, No. 2, March 1959, pp. 90 to 98. 324/0.5N.